US012578794B2

(12) United States Patent
Jadidian et al.

(10) Patent No.: US 12,578,794 B2
(45) Date of Patent: Mar. 17, 2026

(54) SKIN DETECTION USING VOLTAGE REPRESENTATIONS OF FREQUENCIES

(71) Applicant: Microsoft Technology Licensing, LLC, Redmond, WA (US)

(72) Inventors: Jouya Jadidian, Los Gatos, CA (US); Mohammad Mustafa Malik, Snoqualmie, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 324 days.

(21) Appl. No.: 18/303,531

(22) Filed: Apr. 19, 2023

(65) Prior Publication Data

US 2024/0353924 A1    Oct. 24, 2024

(51) Int. Cl.
*G06F 3/01* (2006.01)
*G06F 3/044* (2006.01)

(52) U.S. Cl.
CPC ............ *G06F 3/015* (2013.01); *G06F 3/0443* (2019.05); *G06F 3/0447* (2019.05)

(58) Field of Classification Search
CPC .......... G06F 3/011; G06F 3/015; G06F 3/017; G06F 3/044; G06F 3/0443; G06F 3/0447; G06F 1/163; H03K 17/955; G01R 27/26; G01R 27/2605
See application file for complete search history.

(56) References Cited

U.S. PATENT DOCUMENTS

| | | | |
|---|---|---|---|
| 5,012,206 A | 4/1991 | Tigges | |
| 5,442,347 A * | 8/1995 | Vranish | H03K 17/955 |
| | | | 340/870.37 |
| 6,724,324 B1 * | 4/2004 | Lambert | H03K 17/955 |
| | | | 340/562 |

(Continued)

FOREIGN PATENT DOCUMENTS

| | | |
|---|---|---|
| EP | 0998659 A1 | 5/2000 |
| KR | 20090022085 A | 3/2009 |

OTHER PUBLICATIONS

"International Search Report and Written Opinion Issued in PCT Application No. PCT/US22/028879", Mailed Date: Aug. 9, 2022, 14 Pages.

(Continued)

*Primary Examiner* — Huy Q Phan
*Assistant Examiner* — David B Frederiksen
(74) *Attorney, Agent, or Firm* — Alleman Hall LLP

(57) ABSTRACT

A wearable device comprises an exteriorly positioned first electrode and a reporting capacitor. The first electrode forms a first side of the reporting capacitor, and a second side of the reporting capacitor is formed by skin of a user when the wearable device is worn. An oscillator is configured to output a signal to drive the first electrode at a first frequency. The oscillator is configured such that changes in capacitance at the reporting capacitor adjust the signal output by the oscillator from the first frequency to a second frequency. A frequency-to-voltage converter is configured to generate a (Continued)

voltage representation of the second frequency. A controller determines a change between the first frequency and the second frequency based on the voltage representation and indicates an amount of movement of skin of the user relative to the first electrode based on the determined frequency change.

20 Claims, 9 Drawing Sheets

(56) References Cited

U.S. PATENT DOCUMENTS

| | | | | |
|---|---|---|---|---|
| 2009/0219039 | A1 | 9/2009 | Fasshauer | |
| 2011/0295087 | A1* | 12/2011 | Shinoda | A61B 5/1477 |
| | | | | 73/29.01 |
| 2013/0023751 | A1* | 1/2013 | Lichtenstein | A61B 5/0537 |
| | | | | 600/390 |
| 2014/0107493 | A1* | 4/2014 | Yuen | A61B 5/7455 |
| | | | | 600/479 |
| 2016/0026212 | A1 | 1/2016 | Lee | |
| 2016/0038055 | A1* | 2/2016 | Wheeler | A61B 5/7225 |
| | | | | 600/301 |
| 2016/0073914 | A1* | 3/2016 | Lapetina | A61B 5/282 |
| | | | | 600/384 |
| 2016/0192716 | A1* | 7/2016 | Lee | G06F 1/163 |
| | | | | 2/243.1 |
| 2019/0212822 | A1 | 7/2019 | Keller et al. | |
| 2022/0404175 | A1 | 12/2022 | Jadidian et al. | |

OTHER PUBLICATIONS

International Search Report and Written Opinion received for PCT Application No. PCT/US2024/023516, Aug. 8, 2024, 14 pages.

* cited by examiner

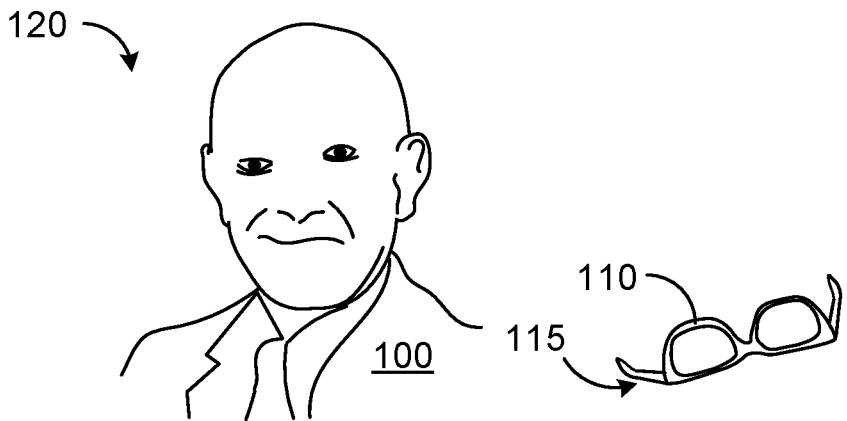
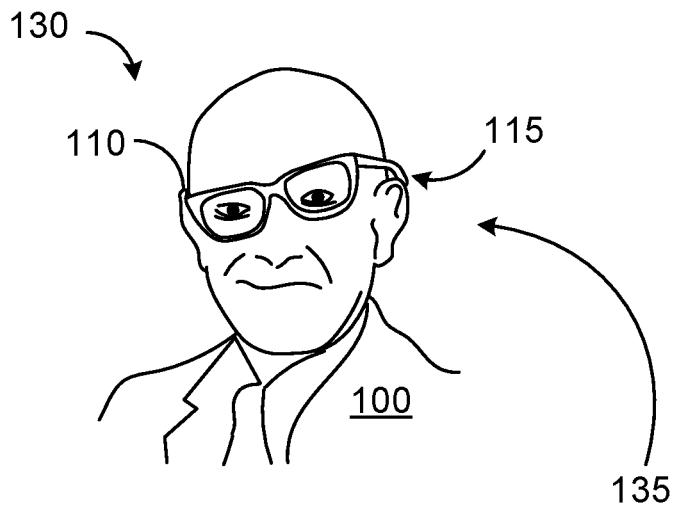
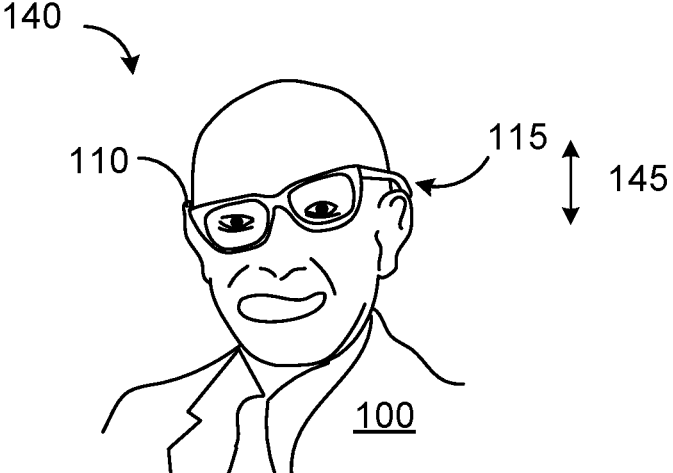
FIG. 1

700

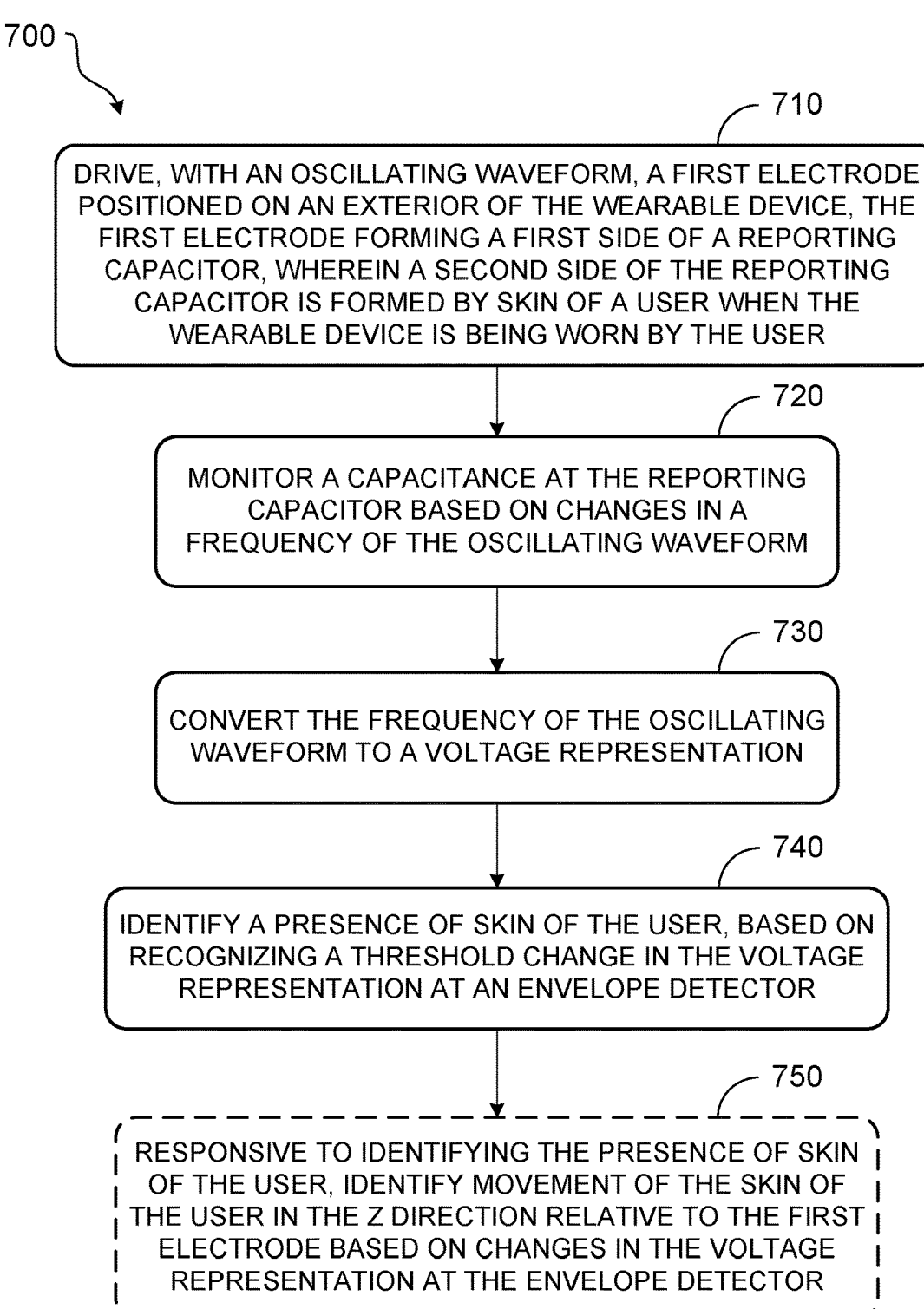

710

DRIVE, WITH AN OSCILLATING WAVEFORM, A FIRST ELECTRODE POSITIONED ON AN EXTERIOR OF THE WEARABLE DEVICE, THE FIRST ELECTRODE FORMING A FIRST SIDE OF A REPORTING CAPACITOR, WHEREIN A SECOND SIDE OF THE REPORTING CAPACITOR IS FORMED BY SKIN OF A USER WHEN THE WEARABLE DEVICE IS BEING WORN BY THE USER

720

MONITOR A CAPACITANCE AT THE REPORTING CAPACITOR BASED ON CHANGES IN A FREQUENCY OF THE OSCILLATING WAVEFORM

730

CONVERT THE FREQUENCY OF THE OSCILLATING WAVEFORM TO A VOLTAGE REPRESENTATION

740

IDENTIFY A PRESENCE OF SKIN OF THE USER, BASED ON RECOGNIZING A THRESHOLD CHANGE IN THE VOLTAGE REPRESENTATION AT AN ENVELOPE DETECTOR

750

RESPONSIVE TO IDENTIFYING THE PRESENCE OF SKIN OF THE USER, IDENTIFY MOVEMENT OF THE SKIN OF THE USER IN THE Z DIRECTION RELATIVE TO THE FIRST ELECTRODE BASED ON CHANGES IN THE VOLTAGE REPRESENTATION AT THE ENVELOPE DETECTOR

SKIN DETECTION USING VOLTAGE REPRESENTATIONS OF FREQUENCIES

BACKGROUND

Capacitive sensing for touch or proximity has been applied to many different applications including wearable devices and touch-sensitive display devices. Traditional touch-screen sensors often employ switch capacitors where current is dumped into a capacitor and either that current or the charge formed on the capacitor is evaluated. The signal at the capacitor is sampled, and gain is applied to amplify the signal. Touch applications assume the capacitance will be large, as the user is making direct contact with the device. As such, the detection range is relatively small. But, as capacitance is distance dependent, touch applications do not need high sensitivity. For wearable devices, where there is a gap between the sensor and the skin, or where the skin is consistently in contact with the sensor, much higher sensitivity is needed to discern subtle changes.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A wearable device is presented. The wearable device comprises an exteriorly positioned first electrode and a reporting capacitor. The first electrode forms a first side of the reporting capacitor, and a second side of the reporting capacitor is formed by skin of a user when the wearable device is worn. An oscillator is configured to output a signal to drive the first electrode at a first frequency. The oscillator is configured such that changes in capacitance at the reporting capacitor adjust the signal output by the oscillator from the first frequency to a second frequency. A frequency-to-voltage converter is configured to generate a voltage representation of the second frequency. A controller determines a change between the first frequency and the second frequency based on the voltage representation and indicates an amount of movement of skin of the user relative to the first electrode based on the determined frequency change.

BRIEF DESCRIPTION OF THE DRAWINGS

FIG. 1 illustrates a user putting on and engaging with a wearable computing device in the form of a head-mounted display (HMD) device.

FIG. 7 shows a flow diagram for an example method of recognizing skin of a user at a wearable device.

FIG. 8 shows an example plot illustrating discernment of femto-level capacitance at a wearable device.

DETAILED DESCRIPTION

Figure 2:
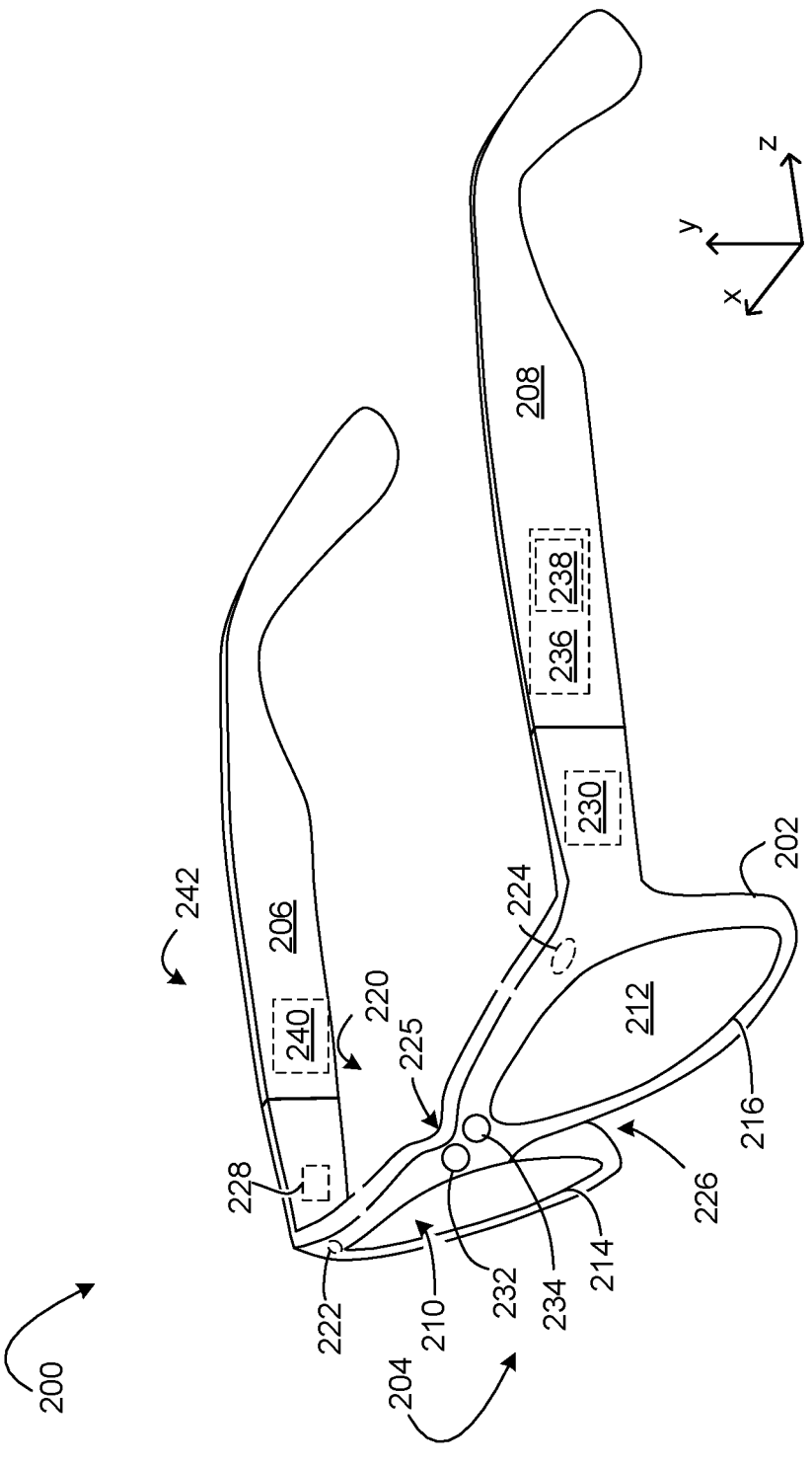
FIG. 2 shows an example of an HMD device.

Wearable computing devices, such as HMDs with an eyeglass form factor can have antennas on different portions of the glasses. Antennas may be positioned on the right temple and the left temple, with additional antennas or electrodes around the frame and lenses. Those antennas can be used to both drive a signal and also detect changes in that signal that happen as a result of the face moving or being in certain positions.

For facial expression tracking, capacitance is generally detected with electrodes at the temple and left and right arms of the glasses, as those portions of a head-wearable device are reliably in close proximity, if not in contact with, the skin of the face of the user. The electrodes or antennas are generally copper geometries or similar that are positioned on the temples and in front of the glass "lens" portions. Indium-Tin-Oxide (ITO), which is transparent, may be incorporated into the lenses, and additional conductive elements may be connected to the ITO electrodes, with a drive circuit applied to those conductive elements.

In this way, a reporting capacitor that effectively acts as a plate capacitor is formed between the copper antennas of the device and the face of the user. An additional electrode can be positioned on the frame or elsewhere along the wearable device that makes direct contact with the skin of the user and connects the skin to a ground node.

As an example, FIG. 1 shows a user 100, and an HMD device 110. HMD device 110 comprises an RF face detection system 115. RF face detection system 115 is configured to determine whether user 100 is wearing HMD device 110, and if so, to track movement of the skin and face of user 100 based on determined changes in capacitance. For example, RF face detection system 115 may sense local movements of skin at the temple of user 100 that are known to correspond to jaw movements.

At 120, user 100 is not wearing HMD device 110, and only baseline capacitance is sensed by RF face detection system 115. At 130, user 100 places HMD device 110 on their head, as indicated at 135. RF face detection system 115 may thus sense a significant change in capacitance, indicating that HMD device 110 is now being worn. The detected capacitance may thus be configured as a baseline capacitance for detecting changes that correlate with facial movements of user 100. At 140, user 100 begins talking, as indicated at 145. This movement of the face of user 100 relative to HMD device 110 can be recognized by RF face detection system 115 based on modest changes in capacitance.

The relative position and movements of the face thus modulate or change the capacitance at the capacitor. In example circuits described herein, an oscillator is used to generate the drive signal. The circuit can be both a detection circuit and a driving circuit. Modulations to the capacitance are fed back into the oscillator, directly impacting the oscillator frequency. Signal information from the oscillator may then be recorded, and then translated from the frequency domain to a direct current (DC) voltage. That voltage can be measured, and changes in capacitance inferred based at least on the baseline frequency of the oscillator. As such, the position of the face impacts the capacitance, which impacts the frequency of the oscillator.

Previously, some solutions involved an inductor-capacitor-resistor (LCR) circuit configured to operate on a fairly high voltage at the front end. In order to carry that voltage forward, the downstream and log components would have to operate on even higher voltages. Such a circuit consumes a significant amount of battery power and voltage.

Herein, a low voltage driven complementary metal oxide semiconductor (CMOS) fabricated circuit is presented for capacitance measurement with acceptable dynamic range and resolution for a wearable device, such as head mounted display comprising an RF face tracking subsystem. Such a circuit does not need to include a high-Q inductor or a bipolar amplifier. Rather, a single switch can be used along with a unipolar amplifier.

An oscillator can drive a first electrode that is in proximity to skin of a user wearing the device, such that movement of skin relative to electrode affects capacitance between the user's skin and the electrode, which in turn affects the frequency of oscillator. Downstream of the oscillator and the electrode, the signal is converted from the frequency domain to the amplitude domain. An envelope detector may receive the converted signal and determine the oscillator frequency and thus the capacitance between the electrode and the skin of the user. This allows for the detection of both presence of user skin and movement of the skin surface in the Z direction relative to the electrode. Presence may be identified with an initial large change in voltage representing corresponding in capacitance/frequency. The frequency baseline may then be reset, so that movement of skin relative to the device can be detected by determining alterations in capacitance.

FIG. 2 shows one example of a wearable computing device in the form of HMD device 200. HMD device 200 includes a frame 202, a display system 204, and temple pieces 206 and 208. Display system 204 includes a first display 210 and a second display 212 supported by frame 202. Each of first display 210 and second display 212 include optical components configured to deliver a projected image to a respective eye of a user. HMD device 200 may be an example of HMD device 110.

Display system 204 of HMD device 200 includes a first display module 214 for generating and displaying a first image via first display 210 and a second display module 216 for generating and displaying a second image via the second display 212. The first image and the second image can be combined to form a stereo image. In other examples, a single display module generates and displays first images and second images via first display 210 and second display 212, respectively. Each display module can comprise any suitable display technology, such as a scanned beam projector, a microLED (light emitting diode) panel, a microOLED (organic light emitting diode) panel, or an LCoS (liquid crystal on silicon) panel, as examples. Further, various optics, such as waveguides, one or more lenses, prisms, and/or other optical elements can be used to deliver displayed images to a user's eyes.

HMD device 200 further includes an eye-tracking system 220, comprising at least a first eye-tracking camera 222 and a second eye-tracking camera 224. Data from the eye-tracking system 220 can be used to detect user inputs and to help render displayed images in various examples.

Eye-tracking system 220 can further include a light source 225. Light emitted by light source 225 may reflect off of a user's eye and be detected by first eye-tracking camera 222 and a second eye-tracking camera 224. For example, reflections may be detected as bright spots on a surface of the user's eye. A location of the reflection relative to the user's eye may thus indicate a direction of the user's gaze.

In some examples, the light source and the camera of the eye-tracking system are both located on frame 202 of HMD device 200. In some examples, relatively small (e.g., 50 µm) light emitting diodes (LEDs) can be attached to the first display 210 and the second display 212. In other examples, a planar waveguide can be incorporated into the displays or adjacent layers to linearly guide eye-tracking light to one or more desired output location(s).

In this example, first eye-tracking camera 222 and second eye-tracking camera 224 are located at a right edge and a left edge of frame 202, respectively, and are configured to detect eye-tracking light reflected by the user's right eye and left eye, respectively. In other examples, left and right cameras can be located at other locations on frame 202, such as at the nose bridge portion 226 of frame 202. In some examples as described below, the eye-tracking light comprises infrared light and first eye-tracking camera 222 and second eye-tracking camera 224 comprise infrared cameras.

The position of the user's eye(s) can be determined by eye-tracking system 220 and/or gesture recognition machine 228. For example, eye-tracking system 220 can receive image data from first eye-tracking camera 222 and second eye-tracking camera 224. Eye-tracking system 220 can evaluate such received image data using one or more neural networks and/or other machine-learning devices. As an example, eye-tracking system 220 may determine the position of the user's eye based on the center point of the user's eye, the center point of the user's pupil. Additionally or alternatively, gesture recognition machine 228 can estimate the location of the eye based on the location of the head-joint of the virtual skeleton.

HMD device 200 further includes an on-board computing system in the form of a controller 230 configured to render the computerized display imagery via first display module 214 and second display module 216. Controller 230 is configured to send appropriate control signals to first display module 214 to form a right-eye image of a stereoscopic pair of images. Likewise, controller 230 is configured to send appropriate control signals to second display module 216 to form a left-eye image of the stereoscopic pair of images. Controller 230 can include a logic subsystem and a storage subsystem, as discussed in more detail below with respect to FIG. 9. Operation of HMD device 200 can additionally or alternatively be controlled by one or more remote computing device(s) (e.g., in communication with HMD device 200 via a local area network and/or wide area network).

HMD device 200 may further include various other components, for example an outward facing two-dimensional image camera 232 (e.g. a visible light camera and/or infrared camera), an outward facing depth imaging device 234, and a sensor suite 236. Sensor suite 236 can include one or more IMUs 238 which can include one or more accelerometers, gyroscopes, and/or magnetometers. IMUs 238 can be configured to generate positional information for HMD device 200 that allows for determining a 6DOF position of the device in an environment. HMD device 200 may further include a plurality of components that are not shown, including but not limited to speakers, microphones, temperature sensors, touch sensors, biometric sensors, other image sensors, energy-storage components (e.g. battery), a communication facility, a global positioning system (GPS) receiver, etc.

HMD device 200 can further include a face tracking system 240 and one or more RF face tracking arrays 242. RF face tracking array 242 can include a plurality of RF channels, each including one or more RF antennas. RF antennas can be placed at any suitable location on HMD device 200, including on frame 202, frame 202, temple pieces 206 and 208, first display 210 and second display 212. A ground reference can be established on the device chassis, such as on an earpiece of temple pieces 206 or 208. As will be described in more detail below, any or all of the plurality of RF antennas can be driven to influence electrical conditions in the vicinity of a human user. This can be done by driving the plurality of RF antennas to emit electromagnetic radiation having any suitable wavelength, amplitude, and/or other suitable characteristics.

Figure 3:
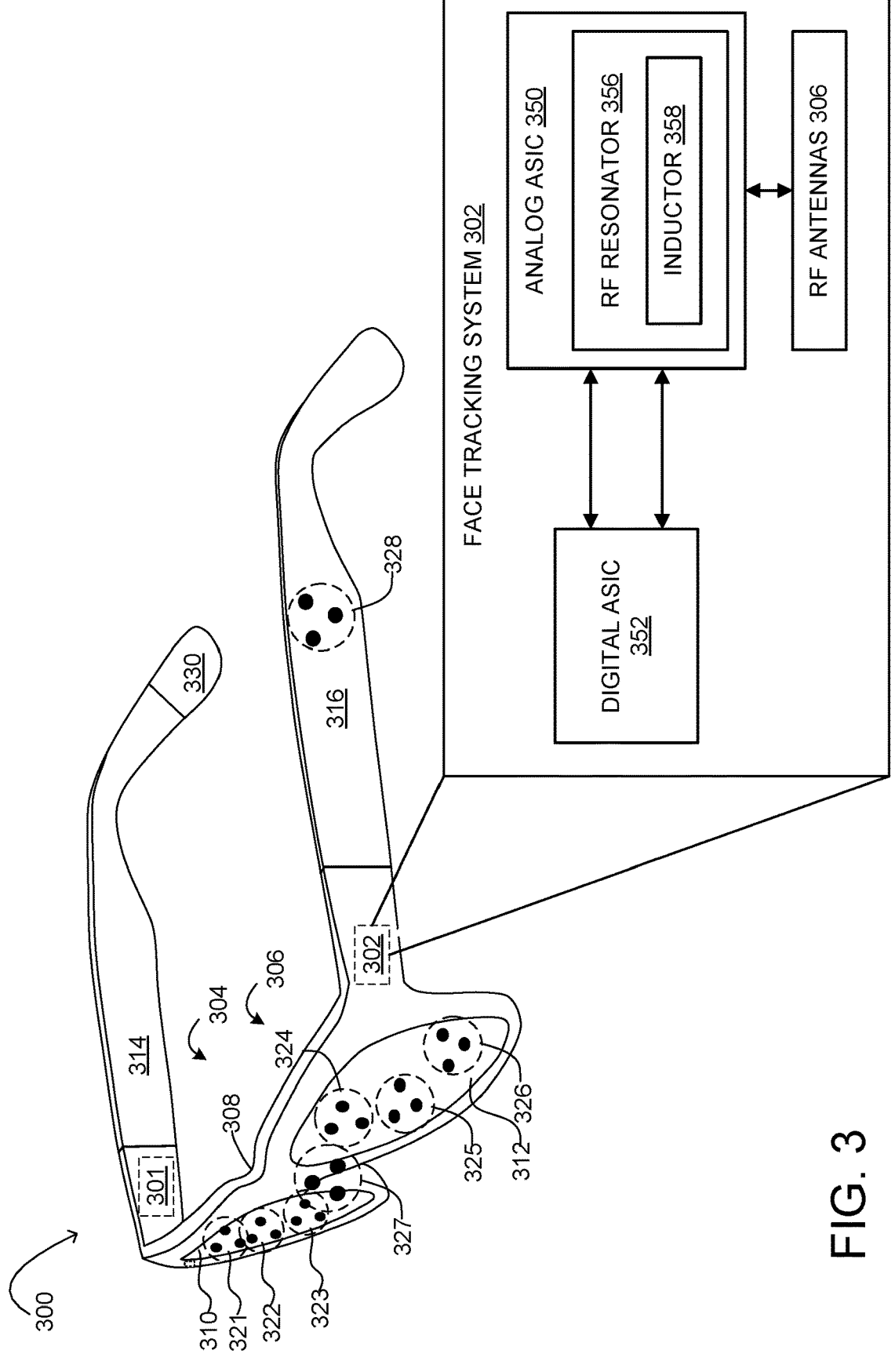
FIG. 3 shows an example of an HMD device including a radio frequency (RF) face tracking system.

A more detailed example of a face tracking machine is shown in FIG. 3. HMD device 300 is shown to comprise controller 301, face tracking system 302 and RF face tracking array 304. HMD device 300 may be an example of HMD devices 115 and 200. Controller 301 may be an example of controller 230. Face tracking system 302 may be an example of face tracking system 240, and RF face tracking array 304 may be an example of RF face tracking array 242. HMD device 300 is shown in simplified form but can include some or all of the components and functions described with regard to HMD device 200, as well as additional components and functions that are not described herein.

RF face tracking array 304 includes a plurality of RF antennas 306, represented by black circles disposed along frame 308, display 310 and 312, and temples 314 and 316 of HMD device 300. It will be understood that this is done for the sake of illustration only—in practical examples, a computing device can include and/or interface with any suitable number of RF antennas. The plurality of RF antennas can each have any suitable positions relative to one another, the computing device, and the human user. For example, rather than being integrated within a housing of the computing device as is shown in FIG. 2, the plurality of RF antennas can be physically separate from the computing device that classifies the human movement. For example, the RF antennas can be integrated into a wearable accessory that communicates with a separate computing device. Furthermore, the RF antennas can have any suitable appearance, and may or may not be visible to the human user and/or an outside observer.

In this example, RF antennas 306 are grouped into eight example RF channels (321, 322, 323, 324, 325, 326, 327, and 328), illustrated by dashed lines around groups of 3 antennas. However, more or fewer antennas can be included in an RF channel, and the channels need not be comprised of equal numbers of antennae. More (e.g., 16) or fewer (e.g., 4) RF channels can be included. Antenna signals can be determined relative to ground 330—e.g., the device chassis. Ground 330 is shown at the end of temple 314, but any suitable position along the HMD device can be used.

RF signals received via display, outer frame, and nose bridge channels can be processed to look for presence and movement of cheeks, eyebrows, forehead, and nose. RF signals received via channels positioned at the bottom of the temple, for example, can be used to look for the user's ears and the head. Each channel can aggregate two or more antennas, though in some examples, a channel may comprise only a single antenna. Groups of RF channels can be electrically coupled to a common relay, allowing for multiple channels to be activated or deactivated together. As more antennas and/or channels are made to be active, the more sensitive the face tracking machine can be, both in terms of detecting relatively small movements, as well as detecting movements over an increased distance.

Antennas positioned on or within displays 310 and 312 can be configured as relatively transparent wires. High transmission antenna types suitable for use on displays 310 and 312 include nanoweb, (a sub-micron, super conductive metal mesh), ITO, silver flakes, and nanowires. Antennas can be affixed to a substrate, or directly to the display materials, and can be sandwiched within a display or provided on the surface of a display.

Each individual RF antenna 306 can in some cases expose a different part of the human user's body surface to an E-field. For example, one or more RF antennas (e.g., 321-326) can generate an E-field in the vicinity of the user's eyes, while one or more other RF antennas (e.g., 327) can generate an E-field in the vicinity of the nose, and so on to achieve a desired coverage of the user's face. This may enable HMD device 300 to detect movements of the user's face and classify such movements as predefined movements that serve as inputs to the computing device—e.g., different facial expressions.

For example, as human skin is conductive, proximity of the conductive human skin in a near-field region relative to the plurality of RF antennas may disturb an E-field generated by driving the plurality of RF antennas with drive signals, thereby influencing characteristics of the circuitry at one or more of the plurality of RF antennas. In particular, movement of conductive skin near an RF antenna (e.g., caused by movement of muscles under the skin) may affect the impedance at the RF antenna in a measurable way. This change in electrical conditions at the RF antenna can be useable to derive information relating to the user's movement. For example, a change in the distance between the conductive human skin and the RF antenna can result in a change in the electrical conditions at the antenna—e.g., detectable as a change in voltage. The user's movement can then be classified as one or more predefined human movements (e.g., recognizable gestures or facial expressions) by aggregating and interpreting data collected by the plurality of RF antennas.

In this manner, detected changes in electrical conditions at the plurality of RF antennas from one time frame to another can be used to evaluate movements of the human user between the two time frames. In particular, movement of the human user may change characteristics of a circuit that the user is also part of. As one example, the system can comprise an oscillator having a resonant frequency that is sensitive to changes in parasitic capacitance. In other words, the change in frequency of the oscillator may be caused by a change in capacitive loading at the user's body surface, and this capacitive loading can be affected by movements of the user.

The plurality of RF antennas may continue to expose the surface of the face of the human user to the E-field over a sequence of time frames. For example, the user's eyebrow may have lowered relative to the user's eye and either display 310 or 312. This movement of the human user (e.g., movements of muscles in the user's face) can influence electrical conditions at one or more of the plurality of RF antennas, as discussed above.

Face tracking system 302 can include electronic componentry that can be useable to implement and control a plurality of RF antennas, as described herein. For example, each RF antenna 306 can be communicatively coupled with an application-specific integrated circuit (ASIC) 350. As one non-limiting example, ASIC 350 can be an analog ASIC implemented via a BCD (bipolar-CMOS-DMOS (double diffused metal oxide semiconductor)) process. BCD technology is beneficially more accessible in larger process nodes, while supporting relatively higher voltages associated with a higher Q-factor.

The analog ASIC can be communicatively coupled with a digital ASIC 352, which can use a relatively smaller process for digital blocks, while the analog ASIC is relatively larger to accommodate analog pins for a plurality of RF sensing channels. For example, the digital ASIC can use a CMOS process, while the analog ASIC uses a BCD process. As described further herein, significant power savings may be realized by employing CMOS processes rather than BCD processes. The logical elements can use any suitable combination of hardware to drive and scan one or more RF antennas. For example, RF antennas 306 can be communicatively coupled with an RF resonator 356 and an inductor 358. These elements in combination can be useable to generate drive signals that, when supplied to RF antennas, cause the RF antennas to generate an E-field. It will be understood that the RF resonator and inductor can each take any suitable form, and that the specific arrangement of components depicted in FIG. 3 is non-limiting. For instance, in some examples, multiple RF resonators and/or inductors can be used to drive the plurality of RF antennas, even though only one RF resonator and inductor is shown in FIG. 3.

Face tracking system 302 can scan each of the plurality of RF antennas 306 to individually determine ground-relative changes in electrical conditions for each of the plurality of RF antennas relative to a previous time frame. For example, a change in electrical conditions detected at a particular RF antenna of the plurality of RF antennas can be caused by a change in a distance between the particular RF antenna and the human user while the body surface of the human user is exposed to the E-field.

The changes in electrical conditions may be expressed as measured changes in voltage ($\Delta V$) relative to a previous time frame, and/or as a change in capacitance, current, amplitude, frequency, and/or signal phase. The framerate at which the plurality of RF antennas is scanned to determine ground-relative changes in electrical conditions can be independent from a framerate at which virtual imagery is displayed, and/or framerates at which any other computer operations are performed by the computing device. In this example, the changes in electrical conditions are ground-relative changes in electrical conditions, which include detected changes in voltage at each of the plurality of RF antennas relative to electrical ground 330 of HMD device 300. In other examples, however, the electrical conditions at each RF antenna can be compared to any suitable common reference.

As the changes in electrical conditions for each of the plurality of RF antennas are compared to a common reference (e.g., changes in voltage relative to the wearable computing device ground), the plurality of RF antennas can each be driven to generate the E-field using drive signals having a same voltage and phase. In other examples, however, drive signals having different voltage and/or phase can be applied to two or more of the plurality of RF antennas in determining ground-relative changes in electrical conditions.

The specific frequencies used to drive the RF antennas, and the electrical characteristics of the larger circuit as a whole, can be tuned to achieve a desired level of sensitivity and power draw. Specifically, an RF antenna exposing conductive human skin positioned within a near field region relative to the RF antenna to an E-field may cause capacitive loading of the human skin. This can result in flow of complex or real current between the RF antenna and human user depending on the specific circuit design, the frequency of the drive signal, and the proximity of the human skin.

The computing device can determine a plurality of ground-relative changes in electrical conditions, and a plurality of antenna-relative changes in electrical conditions, for any or all of a plurality of RF antennas exposing the body surface of the user to an E-field. The computing device can then derive a plurality of orthogonal parameters from the ground-relative changes in electrical conditions and the antenna-relative changes in electrical conditions. The movement performed by the human user can then be classified as a particular predefined movement.

For example, the computing device can maintain a set of predefined movements, where each predefined movement is associated with a set of predefined orthogonal parameter values known to be consistent with that predefined movement. Thus, upon determining that a particular set of orthogonal parameters match a predefined set of parameters with at least a threshold similarity, then the detected human movement can be classified as the corresponding predefined movement.

For example, the observed set of orthogonal parameters can be used as values for a multi-dimensional feature vector, which can then be compared to similar vectors corresponding to each of the predefined movements via a suitable vector comparison process—e.g., by calculating a Euclidean distance. As another example, the detected parameters can be classified as predefined parameters based at least in part on suitable machine learning (ML) and/or artificial intelligence (AI) techniques. For example, the HMD device can include a machine learning trained-classifier configured to accept a set of orthogonal parameters as an input, and based on the parameters, classify the detected RF antenna output as one of a plurality of predefined movements. The machine learning-trained classifier can be trained in any suitable way and using any suitable training data—e.g., via a suitable combination of supervised and/or unsupervised learning.

Solutions combining operational amplifiers (opamps) with series resonant resistor-inductor-capacitor (RLC) circuits require high voltage technology such as BCD or similar. BCD systems are costly and are made by relatively few manufacturers. Further, for wearable device implementations, BCD systems are relatively bulky, and maintaining a high Q-factor for the circuit requires series inductors that are relatively large. For high-voltage, resonance-based systems, a bidirectional amplifier is generally required. This also means that two DC voltages are needed to support opamp biases. This, in turn requires two DC/DC boost converters, which occupy a significant amount of board real estate.

For battery-operated wearable devices, and particularly for low power applications such as stand-by mode where detection of a worn device is the primary goal, it is desirable to drive the face detection circuits with relatively low voltage, on the order of 1.2-1.8V. BCD gate voltages far exceed these parameters. In contrast, CMOS voltages can be applied if the system is designed for such purposes.

Herein, systems and circuits are described that reduce the voltage amplitude of both the oscillator and core circuit, using a chain of subcircuits together. This chain of subcircuits may include a voltage follower and a differentiator that combine to convert frequency to voltage, and an envelope detector to measure the voltage. A controller may then determine the change in capacitance based on the changes in voltage.

Figure 4:
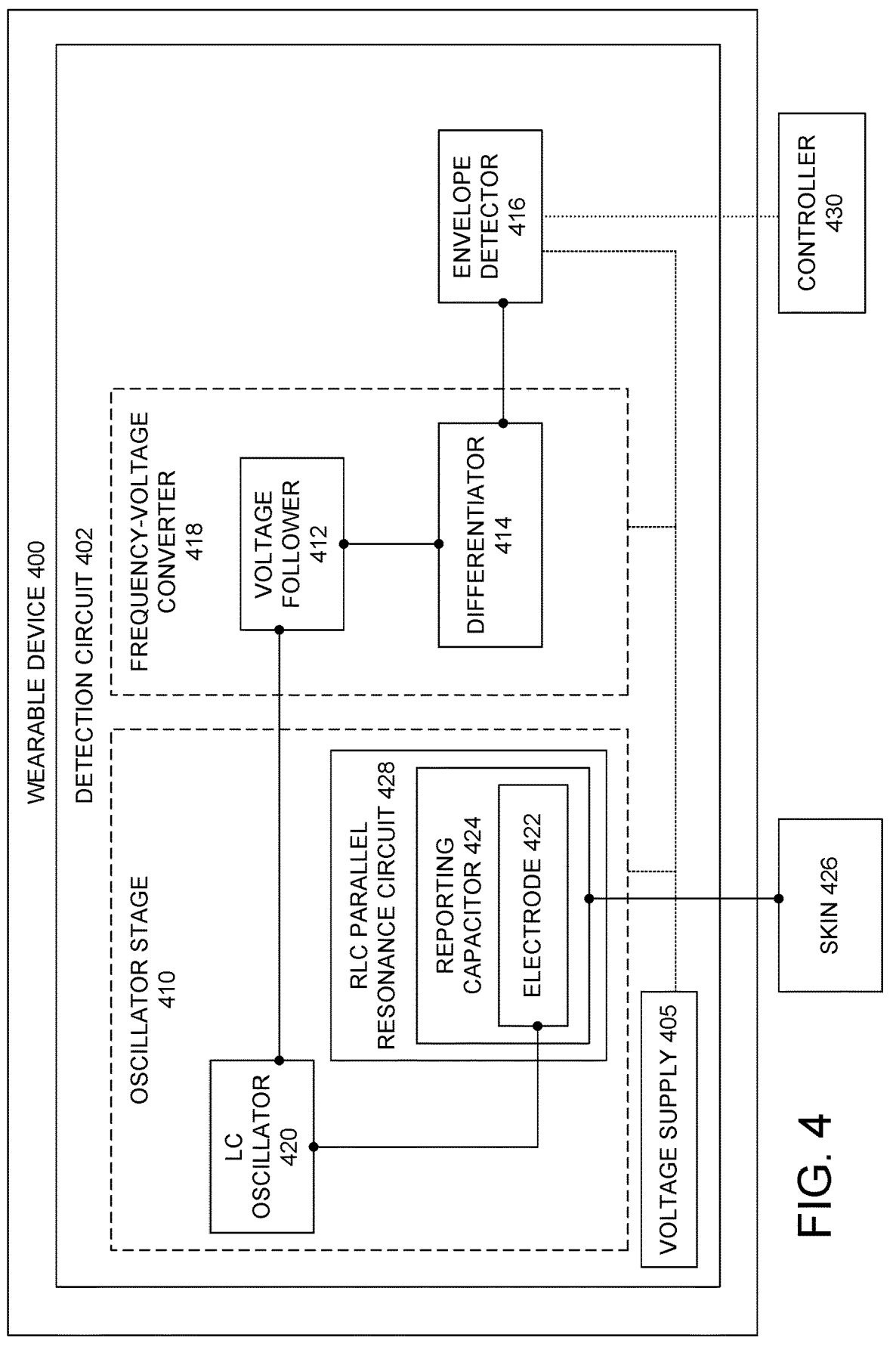
FIG. 4 schematically shows a block diagram for detection circuit comprising an oscillator and downstream circuitry to determine changes in oscillator frequency.

FIG. 4 schematically shows a wearable device 400 comprising a detection circuit 402. Detection circuit 402 may be considered a resonance oscillation-based capacitance measuring system. Detection circuit 402 may be powered by a voltage supply 405.

Detection circuit 402 comprises four sequential stages, including an oscillator stage 410, a voltage follower 412, a differentiator 414, and an envelope detector 416. In some examples, voltage follower 412 and differentiator 414 are components of a frequency-voltage converter 418 configured to generate a voltage representation of the oscillator frequency.

Oscillator stage 410 includes an active inductor-capacitor (LC) oscillator 420, such as a Colpitts oscillator. Oscillator 420 is configured to output an oscillating voltage signal having a frequency that is dependent upon capacitance. The oscillating voltage signal can be used to drive an electrode, such as electrode 422. Electrode 422 may form a reporting capacitor 424 with skin 426 of a user wearing wearable device 400. Skin 426 thus forms a second side of reporting capacitor 424 when wearable device 400 is being worn by the user, Small changes in capacitance at reporting capacitor 424 can generate significant changes in oscillator frequency at LC oscillator 420. For example, capacitance changes on the order of a few hundreds of femtofarads can give rise to a change in frequency on the order of a few kilohertz. As reference, the center frequency or baseline frequency for the oscillator may be set on the order of 7-8 kilohertz (kHz).

Reporting capacitor 424 may be comprised in an RLC parallel resonance circuit 428. RLC parallel resonance circuit 428 can provide an automation frequency to oscillator 420 proportionate to $\frac{1}{2}\pi*$(root LC). Without the resistor, oscillator 420 would be considered a very high Q oscillator. High Q circuits are generally sensitive to electrical changes that occur at a distance. As used herein, a "high Q oscillator" means that the voltage necessitates a signal with a high amplitude. In turn, any analog stages that follow the oscillator (e.g., voltage follower 412, differentiator 414, and an envelope detector 416) would need even higher voltages to enable the corresponding headroom.

Previous circuit technologies have generally been implemented as BCD fabrications. With BCD implementations, the process node can apply high voltages (e.g., 15-16V). At low power in this stage, a resistor that is on the RLC parallel resonance circuit can be tuned. The Q of the inductor can be reduced, and the voltage amplitude can also be reduced.

In examples where oscillator 420 is a Colpitts oscillator, it may be adjusted to operate within a circuit fabrication that is not BCD. Rather than using high Q circuits and high Q oscillators with high voltage amplitudes, the adjusted circuits can operate on a reduced voltage amplitude, thereby avoiding the high voltage BCD-dependent process, and taking advantage of low voltage amplitude rails. Such lower voltage rails are more favorable for operating low power circuits.

These changes to the circuit make it more flexible for low power applications, e.g., a CMOS application where the voltage rail is low power, advanced reduced instruction set computing (RISC) machines (ARM), or other embedded devices. Such devices are typically very low voltage (e.g., 1.2-3.3 V operational range). This enables avoiding the higher voltage processes, allowing for a more regular process to implement capacitance detection based on a resonance model.

For example, if the resistor in RLC parallel resonance circuit 428 were on the order of 100 megaohms, or removed altogether, then the circuit would become very high Q. The Q by which oscillator 420 is governed is proportional to R, and thus the amplitude will become extremely high, on the order of 11-12V. Deliberately selecting a relatively low resistance value can allow that voltage waveform to have a reduced amplitude and a low Q, while maintaining an acceptable capacitance detection. A benefit of using a low Q factor and a relatively low resistance value in implementing detection circuit 402 is the ability to build a sensitive circuit that generates a significant change in oscillation frequency based on a modest change of capacitance, e.g., that generates a significant modulation resulting from modest movements of the user's skin 426.

In this example, oscillator 420 drives electrode 422. Movement of skin 426 in the Z direction relative to electrode 422, generates changes in capacitance at reporting capacitor 424. This capacitance change adjusts the signal output by oscillator 420 from a first frequency to a second frequency. This change in resonant frequency can then be evaluated to determine changes in capacitance at reporting capacitor 424 and thus the presence and/or movement of user's skin 426.

Whether comprising a baseline or capacitance adjusted frequency, the signal output by oscillator 420 enters voltage follower 412. Voltage follower 412 creates a voltage that tracks with the voltage of oscillator 420, operating to effectively copy the oscillator signal, albeit with some phase delay and potentially a slight variation in amplitude. However, the signal output by voltage follower 412 will always track proportionately with the input signal. In this way, the same oscillator voltage is passed to differentiator 414, which then responds to how rapidly the voltage is changing, generating an output voltage that is passed to envelope detector 416.

In BCD based circuits, boost converters are often used to supply voltage to the selected ASIC solution. Voltage follower 412 can instead be driven by operational amplifiers (Opamps). In some examples, the supply rail for differentiator 414 can be made to be relatively large, so that drastic swings of voltage from oscillator 420 can be covered.

Voltage follower 412 operates to isolate loading on the high impedance oscillator side. Effectively, voltage follower 412 acts as a wall or a very high node so that there is very little current flowing through voltage follower 412. As such, the behavior of oscillator 420 is not significantly impacted by the downstream stages and circuit components of detection circuit 402.

In some examples, controller 430 can sample the output signal directly after voltage follower 412. An analog-to-digital-converter (ADC) can be used to insert a differential error. Additionally or alternatively, an ADC can be used that simply samples the oscillation frequency. The sampling rate can be set at a higher frequency than the oscillation frequency using the Nyquist theorem.

Voltage follower 412 then passes the conditioned signal to differentiator 414. Differentiator 414 takes a time derivative of the signal, yielding a sinusoidal signal where the amplitude will be at a maximum where the sinusoidal is at the center and at the crossing point, and will be zero at the peak and at the bottom. The pulsed signal is then passed to envelope detector 416. Envelope detector 416 and differentiator 414 thus work in concert to create the effect of steady state voltage levels. The oscillation is effectively sampled, via a conditioned signal, but in a way that uses few components and is relatively inexpensive. Envelope detector 416 may detect amplitude levels of the output signal, rather than frequency. This allows for a less complicated, or lower-frequency ADC front end that is less expensive. The ADC specifications may depend on the capacitance range that is being measured, and how that is reflected in the dynamic range of the output voltage. Envelope detector 416 may take the high frequency oscillation signal as input and provide the demodulated envelope of the signal as output.

Controller 430 may then sample a signal output by envelope detector 416, and determine the change in capacitance at reporter capacitor 424 by back calculating through the oscillator frequency, via a lookup table, etc. Additionally or alternatively, the rise in the envelope following and the rising of voltage levels may be evaluated in the signal at the output node.

While lowering the value of R in RLC parallel resonance circuit 428 and lowering the voltage amplitude may reduce overall sensitivity, fine movements of the user's skin can be tracked as long as the minimum detectable capacitance change represents an acceptable resolution. For example, 5-10 KHz of change may be detected based on capacitance changes on the order of 100 femtofarads.

Figure 5:
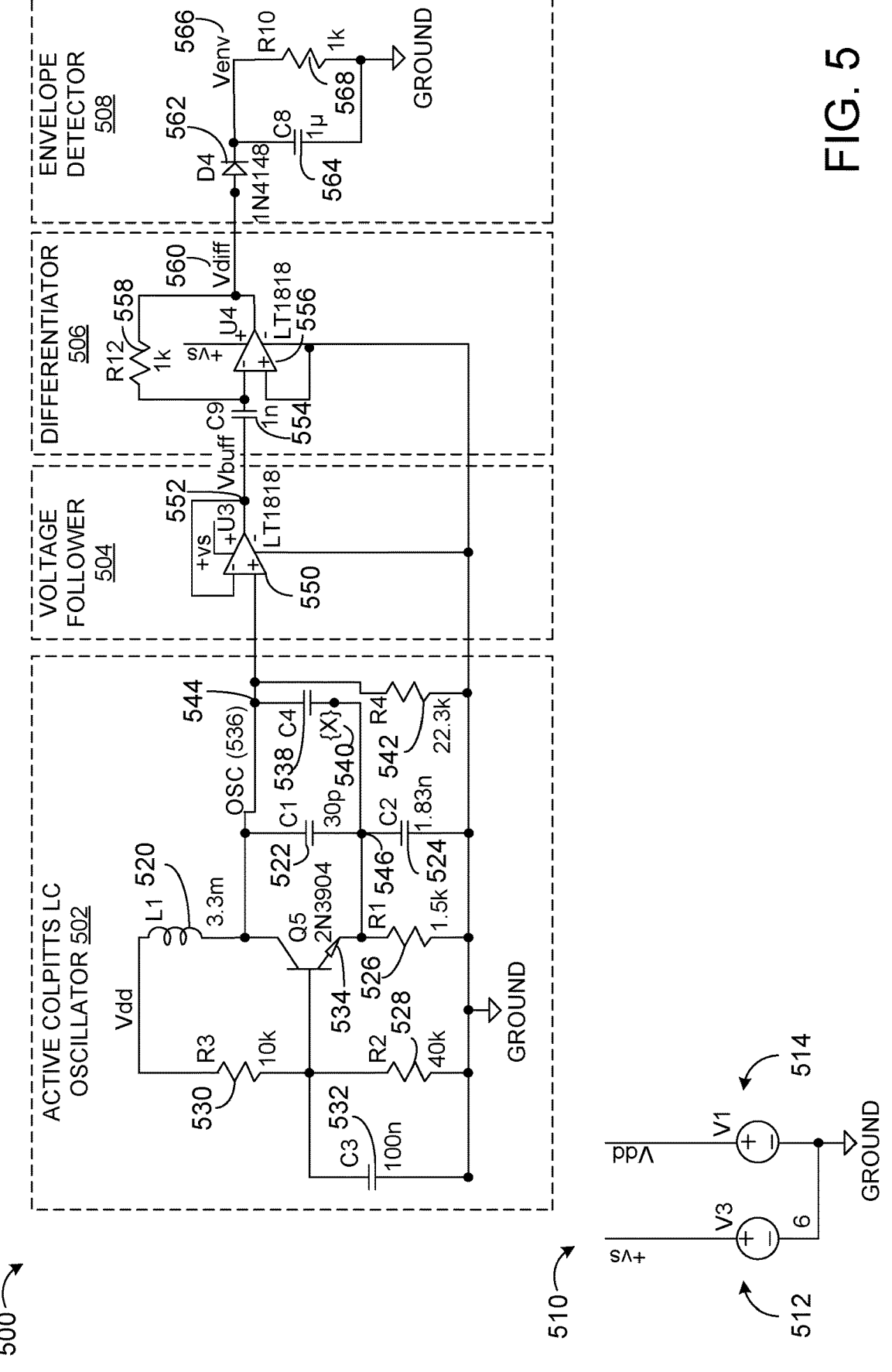
FIG. 5 shows an example circuit diagram for determining changes in capacitance via an envelope follower.

FIG. 5 shows an example circuit 500 for resonance oscillation-based capacitance measurements. Circuit 500 is an example of detection circuit 402. Circuit 500 includes an active Colpitts LC oscillator 502, a voltage follower 504, a differentiator 506, an envelope detector 508, and a voltage supply 510. Active Colpitts LC oscillator 502 is an example of LC oscillator 420, voltage follower 504 is an example of voltage follower 412, differentiator 506 is an example of differentiator 414, envelope detector 508 is an example of envelope detector 416, and voltage supply 510 is an example of voltage supply 405. Indicated values for individual components are merely examples and should not be considered limiting. However, FIG. 5 will be described with reference to these values, noting exceptions where appropriate.

Voltage supply 510 includes positive voltage supply 512 (+Vs, V3) and operating voltage 514 (Vdd, V1). In some examples, a negative voltage supply (−Vs) is included, such as for bipolar applications. As shown, positive voltage supply 512 is set to 6V, and thus operating voltage 514 may be set to values between 0 and 6V. In some examples, positive voltage supply 512 may be lowered (e.g., 3.3V) and operating voltage 514 reduced to 1.2V or even lower.

Oscillator 502 includes inductor 520 (L1), shown with an inductance of 3.3 m, and a split capacitor including first capacitor 522 (C1) and second capacitor 524 (C2). First capacitor 522 is shown with a capacitance of 30 pF, and second capacitor 524 is shown with a capacitance of 1.83 nF. First resistor 526 (R1) and second resistor 528 (R2) provide stability to the circuit, shown here with values of 1.5 kΩ and 40 kΩ, respectively. Oscillator 502 further includes third resistor 530 (R3, shown with a value of 10 kΩ), third capacitor 532 (C3, shown with a value of 100 nF), and NPN bipolar transistor 534 (Q5, shown as a 2N3904 transistor).

Oscillator 502 receives operating voltage 514 (Vdd), generating oscillating signal 536 (OSC), which is used to drive a first electrode of reporting capacitor 538 (C4). Reporting capacitor 538 is formed by the first electrode and skin of the user 540 ({X}). Output of oscillator 502 is further governed by fourth resistor 542 (R4, shown with a value of 22.3 kΩ).

Reporting capacitor 538 is adjacent to voltage follower 504, forming one side of node 544. The other side of node 544 is connected to junction 546 between first capacitor 522 and second capacitor 524. First capacitor 522 and second capacitor 524 may be part of the chip package. Junction 546 can also be connected to ground. When junction 546 is connected to ground, it represents the user's facial expression, as ground is also connected to user's skin 540 via grounded copper electrodes when the device is worn by the user.

As described with regard to FIG. 4, reporting capacitor 538 stores the capacitance between the oscillation node and user's skin 540. Reporting capacitor 538 can be connected directly to second capacitor 524, or it can be connected to ground. Since skin 540 is also connected to ground. In this configuration, the charge stored at reporting capacitor 538 is the capacitance representing the gap between the user's skin 540 and the first electrode. The top side of reporting capacitor 538 is connected to OSC 536. The other (e.g., lower) side of reporting capacitor 538 would be floating. This represents an initial stage that allows the circuit to transfer the oscillation frequency to a more easily measured voltage waveform.

The value of R in fourth resistor 542 impacts both the amplitude and the bias current of oscillator 502. In this example, first capacitor 522 and second capacitor 524 are in series, although their effect can be calculated using a parallel equation. The value of R in fourth resistor 542 is directly proportional to the voltage amplitude of the oscillator signal-reducing this resistance reduces the voltage amplitude. Normal ranges for low power applications can include an operating voltage on the order of 1.2V and a positive voltage supply on the order of 3.3V. Such values allow for acceptable levels of capacitance and detection. Overall sensitivity may be slightly reduced compared to high power applications but changes on the order of 100 fF can still be differentiated.

As such, choosing a lower value for fourth resistor 542 brings down the amplitude of oscillator 502. Frequency changes are still generated in a way that can be discerned, but overall amplitude and voltages are lower. Further reducing the R value for R4 may inhibit oscillation, as R may be too small and too much energy may be lost at R4. An inflection point may thus be identified for a particular circuit that balances the gain and the oscillation.

There are numerous parameters that govern the resistance and the oscillator. One is the gain of the device (e.g., transistor 534), the voltage rails, the I bias and the frequency. By dropping the resistance of fourth resistor 542 very low, (e.g., 1Ω), nearly all of the current and power is diverted through fourth resistor 542. As such, less power is contributed to oscillator 502 itself and the oscillation could altogether stop. If the gain transistor 534 balances the losses, the oscillation stabilizes, and it continues to oscillate without increasing or decreasing in amplitude.

In this scenario, the relationship between amplitude and resistance is targeted to enable a circuit that works on the detector solution with an off-chip resistor that can be tuned in such a way to reduce the power consumed by the circuit. Most time-integrated resistors have a lot of variation, so fourth resistor 542 may be implemented off-chip to provide additional control. However, as with oscillator 502, fourth resistor 542 can be integrated on the chip, as can at least some of the capacitors. In this way, the low Q can be utilized as an advantage.

Signal exiting oscillator 502 is directed to voltage follower 504. Voltage follower 504 includes an opamp based circuit including opamp 550 (U3, shown as an LT1818 opamp). Node 552 (Vbuff) is positioned between voltage follower 504 and differentiator 506, just before differentiator capacitor 554 (C9, shown with a capacitance of 1 nF), which receives the same oscillator signal. Differentiator 506 also includes opamp 556 (U4, shown as an LT1818 opamp), and differentiator resistor 558 (R12, shown with a value of 1 kΩ).

The differentiator differentiates the signal from voltage follower 504, yielding a sinusoid where the output 560 (Vdiff) will be maximum where the sinusoidal is at the center and the crossing point, and output 560 will be zero at the peak and at the bottom. This generates a pulse-out signal.

Output 560 passes through diode 562 (D4, shown as a 1N4148 diode) of envelope detector 508.

When diode 562 is configured in forward bias, it will charge up output capacitor 564. Diode 562 rectifies the incoming signal, allowing current flow only when the positive input terminal is at a higher potential than the negative input terminal. The capacitance of output capacitor 564 will charge on the rising edge of the signal to the point where Vdiff and Vdiff Peak are very similar to the output voltage 566 (Venv). Output resistor 568 (R10, shown with a value of 1 kΩ) will slowly dissipate some stored charge as the input signal amplitude falls, so that output capacitor 564 will not charge in perpetuity, rather reaching a steady-state condition reflective of the frequency of oscillating signal 536, and thus the status at reporting capacitor 538.

Figure 6:
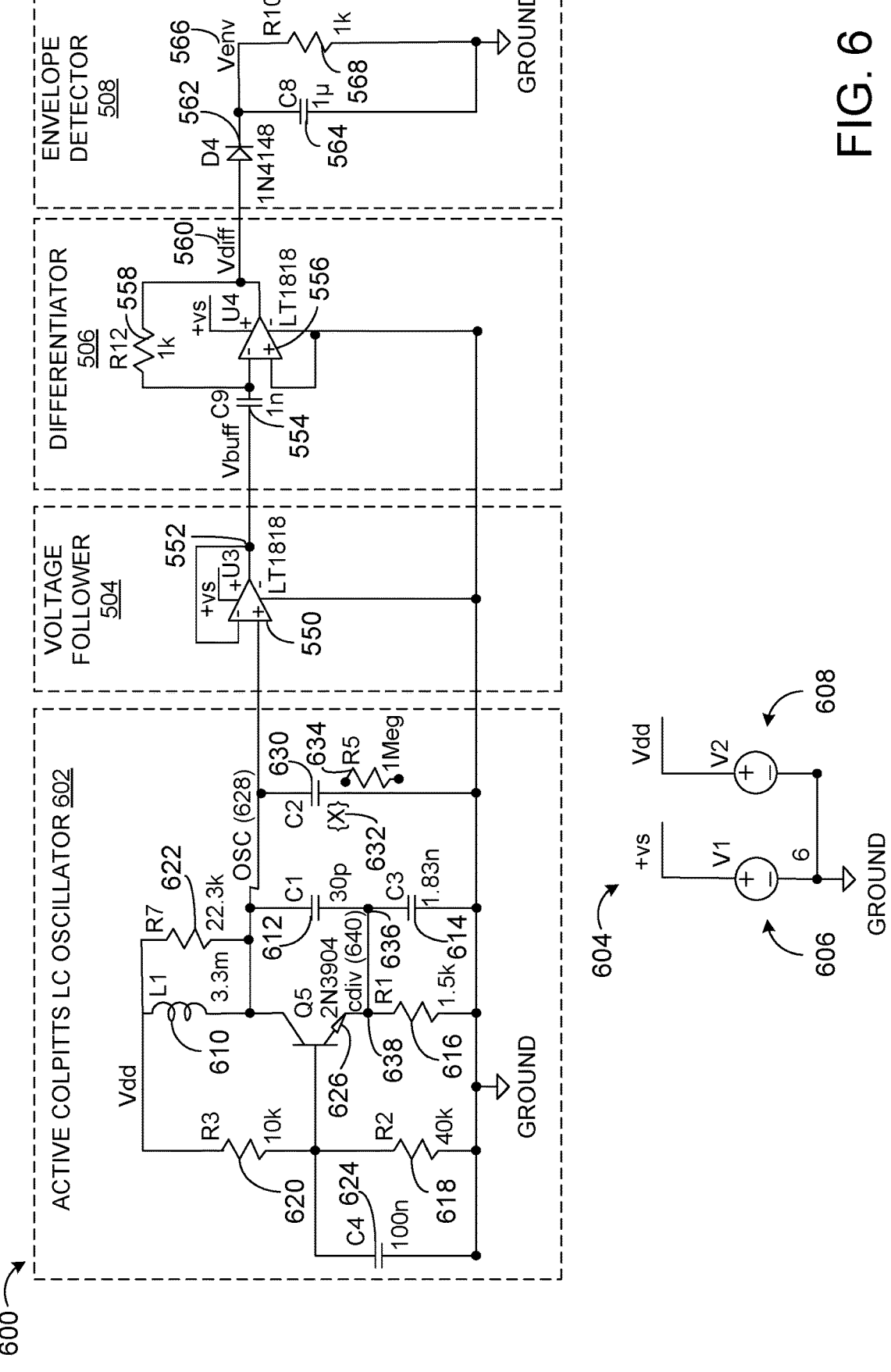
FIG. 6 shows another example circuit diagram for determining changes in capacitance via an envelope follower.

FIG. 6 shows another example circuit 600 for resonance oscillation-based capacitance measurements. Circuit 600 is an example of detection circuit 402. In this example, circuit 600 includes voltage follower 504, a differentiator 506, an envelope detector 508 as described with regard to FIG. 5, though other configurations have been contemplated, and with the acknowledgement that signals emanating from a different oscillator than oscillator 502 may cause voltage follower 504, differentiator 506, and/or envelope detector 508 to behave and perform differently than when employed in circuit 500.

Circuit 600 includes an active Colpitts LC oscillator 602, and a voltage supply 604. Active Colpitts LC oscillator 602 is an example of LC oscillator 420, and voltage supply 510 is an example of voltage supply 405. As per FIG. 5, indicated values for individual components are merely examples, and should not be considered limiting. However, FIG. 6 will be described with reference to these values, noting exceptions where appropriate.

Voltage supply 604 includes positive voltage supply 606 (+Vs, V1) and operating voltage 608 (Vdd, V2). In some examples, a negative voltage supply (−Vs) is included, such as for bipolar applications. As shown, positive voltage supply 606 is set to 6V, and thus operating voltage 608 may be set to values between 0 and 6V.

Oscillator 602 includes inductor 610 (L1), shown with an inductance of 3.3 m, and a split capacitor including first capacitor 612 (C1) and second capacitor 614 (C3). First capacitor 612 is shown with a capacitance of 30 pF, and second capacitor 614 is shown with a capacitance of 1.83 nF. First resistor 616 (R1) and second resistor 618 (R2) provide stability to the circuit, shown here with values of 1.5 kΩ and 40 kΩ, respectively. Oscillator 602 further includes third resistor 620 (R3, shown with a value of 10 kΩ), fourth resistor 622 (R7, shown with a value of 22.3 kΩ) third capacitor 624 (C4, shown with a value of 100 nF), and NPN bipolar transistor 626 (Q5), shown as a 2N3904 transistor. Fourth resistor 622 performs similar functions as to fourth resistor 542 of oscillator 502.

Oscillator 602 receives operating voltage 608 (Vdd), generating oscillating signal 628 (OSC), which is used to drive a first electrode of reporting capacitor 630 (C2). A second electrode of reporting capacitor 630 is formed by skin of the user 632 ({X}). Output of oscillator 602 may further be governed by fourth resistor 634 (R5, shown with a value of 1 MΩ). In this example the reporting capacitor 630 is not connected to node 636 between first capacitor 612 and second capacitor 614. Rather, node 636 is connected to node 638, generating voltage divider capacitance 640 (cdiv).

Circuits 500 and 600 employ a self-capacitance measurement, where the oscillator is both being driven and also acts as the sense electrode. In other examples, other modulation schemes, such as mutual capacitance can be used. For example, in FIG. 6, reporting capacitor 630 may be connected to fourth resistor 634 to generate mutual capacitance. In mutual capacitance circuits, there is both a driving node and a receiving node. In parallel two plates of the capacitor are connected to the circuit. Both of the two plates would be proximal to skin of the user.

Referring to FIG. 5, for reporting capacitor 538, both mutual and self-capacitance are possible. If the skin of the user is not grounded, two plates are necessary for reporting capacitor 538. In such an example, the fringe capacitance (e.g., not the direct field) can be evaluated. If the fringe capacitance is disturbed, it can be detected as the capacitance change of reporting capacitor 538 impacts the equivalent circuit of first capacitor 522 and second capacitor 524 in very minute changes. This can require a separate drive electrode and an additional receive electrode to receive that oscillator's signal and apply the output frequency to the voltage follower.

The user's skin moving towards the electrodes will impinge upon the fringe fields that surround the capacitors. The sensitivity is less than for a self-capacitance circuit, as this change in capacitance is reduced.

If the entire circuit 500 is positioned on a chip, excepting for two additional nodes, one of these additional nodes can be connected to the chip and the other additional node can be connected to ground. If one of the pins of the chip connects between first capacitor 522 and second capacitor 524, the other pin is connected to ground, and thus connected to reporting capacitor 538. Such a circuit can then operate in either mutual or self-capacitance.

In circuit 500, first capacitor 522 and second capacitor 524 are in series, but first capacitor 522 dominates as it is relatively small. Reporting capacitor 538 will thus always be parallel to first capacitor 522, because second capacitor 524 is very large. The C1-C2 relationship is C1*C2/(C1+C2). For the capacitance values shown in FIG. 5, this is close to 30 picofarads. Reporting capacitor 538 will thus be in parallel to first capacitor 522, whether at this value, or if first capacitor 522 is connected to ground. Effectively, first capacitor 522 and second capacitor 524 act as a voltage divider, passing high frequency signals and oscillating signals that are changing.

FIG. 7 shows an example method 700 for a wearable device. Method 700 may be performed in concert with a wearable device such as wearable device 400, employing a resonance oscillation-based capacitance measuring system such as detection circuit 402, circuit 500, or circuit 600.

At 710, method 700 includes, driving, with an oscillating waveform, a first electrode positioned on an exterior of the wearable device, the first electrode forming a first side of a reporting capacitor, wherein a second side of the reporting capacitor is formed by skin of a user when the wearable device is being worn by the user. The oscillating waveform may be generated by an LC oscillator, such as a Colpitts oscillator. At 720, method 700 includes monitoring a capacitance at the reporting capacitor based on changes in the frequency of the oscillating waveform.

At 730, method 700 includes converting the frequency of the oscillating waveform to a voltage representation. In some examples, converting the frequency of the oscillating waveform to a voltage representation comprises passing the oscillating waveform through a differentiator configured to take a time derivative of the oscillating waveform. This may generate a pulsed signal output by the differentiator. In some examples, the oscillating waveform is passed through a voltage follower prior to passing through a differentiator. In this way, the load of the oscillator generating the oscillating waveform may be isolated.

At 740, method 700 includes identifying a presence of skin of the user, based on recognizing a threshold change in the voltage representation at an envelope detector. In some examples, the envelope detector is configured to receive the time derivative of the oscillating waveform from the differentiator, and to output amplitude levels of the voltage representation to a controller. The controller may then evaluate the amplitude levels to determine the oscillation frequency, and thus the capacitance at the reporting capacitor to compare against the threshold.

Optionally, at 750, method 700 includes, responsive to identifying the presence of skin of the user, identifying movement of the user skin in the Z direction relative to the first electrode based on changes in the voltage representation at an envelope detector. Such changes in the voltage representation may be of lesser amplitude than the threshold change described at 740.

Figure 8:
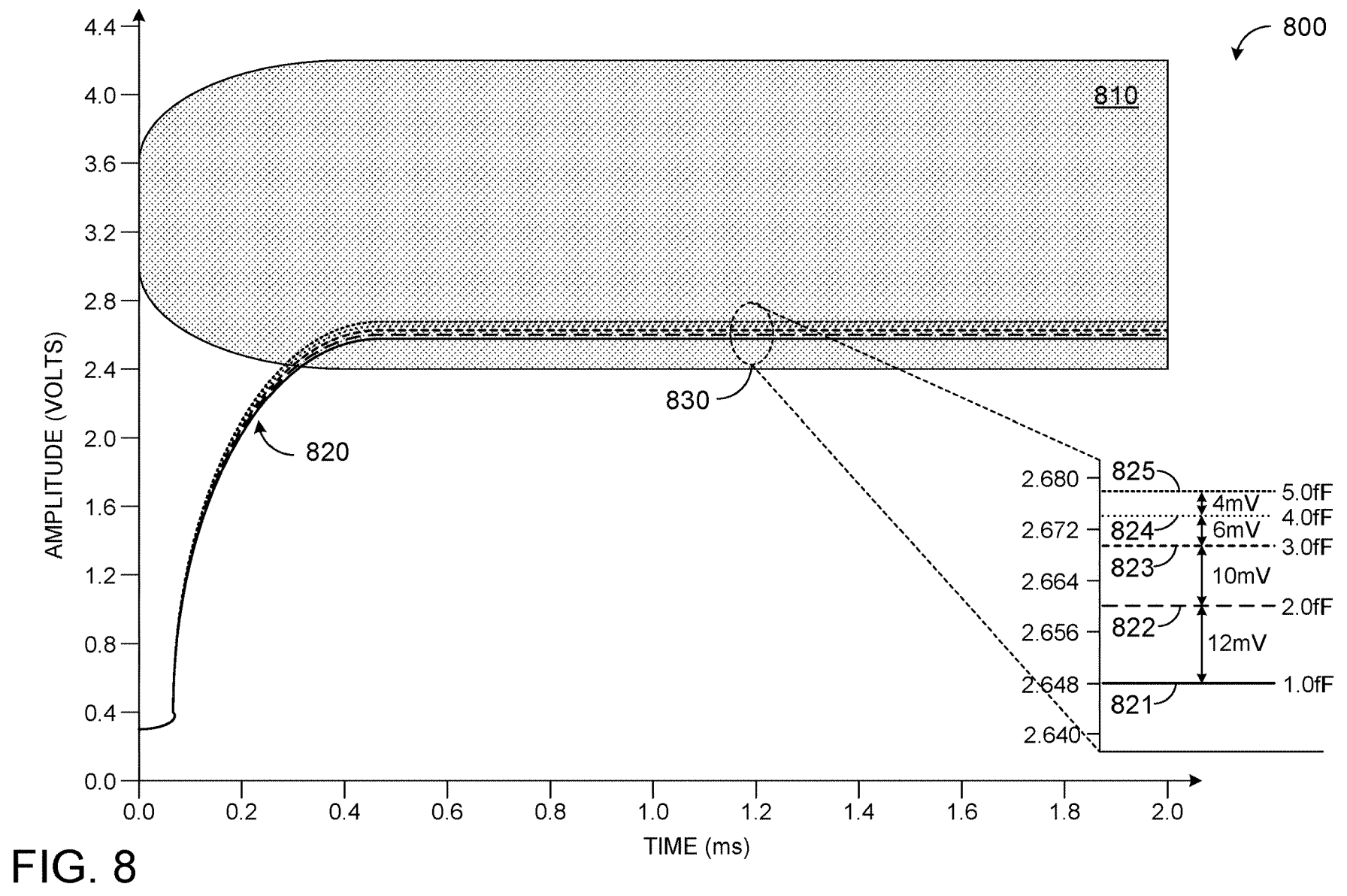

FIG. 8 shows an example plot 800 simulating how changes in capacitance over time at reporting capacitor 538 of FIG. 5 manifest as changes in voltage at envelope detector 508. Plot 800 shows signal amplitude in volts over time in milliseconds with a 6V supply voltage. At 810, the amplitude of an oscillator signal from oscillator 502 is shown, oscillating between 2.4 and 4.2 V. At 820, voltages output by envelope detector 508 are indicated for a cluster of simulated (e.g., external) capacitance values at reporting capacitor 538. The capacitance values are swept up from 0 fF and reach a steady state after approximately 0.5 ms. Trace 821 approaches 1.0 fF, trace 822 approaches 2.0 fF, trace 823 approaches 3.0 fF, trace 824 approaches 4.0 fF, and trace 825 approaches 5.0 fF.

As shown in inset 830, adjusting capacitance at (C4 5xx) from 1.0 fF to 2.0 fF yields an amplitude difference of 12 mV. Adjusting capacitance at (C4 5xx) from 2.0 fF to 3.0 fF yields an amplitude difference of 10 mV. Adjusting capacitance at (C4 5xx) from 3.0 fF to 4.0 fF yields an amplitude difference of 6 mV. Adjusting capacitance at (C4 5xx) from 4.0 fF to 5.0 fF yields an amplitude difference of 4 mV.

As shown, femto-level capacitance changes can indeed be detected via resonance circuit methodology using only 6V supply voltage, with a 1 fF step change yielding between a 4 mV and 12 mV amplitude change. Prior designs generally use voltage supplied by boost converter to provide over 10V supply to detect femto-level capacitance. Such circuits may modestly improve signal-to-noise ratio, but at the cost of increased power consumption.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
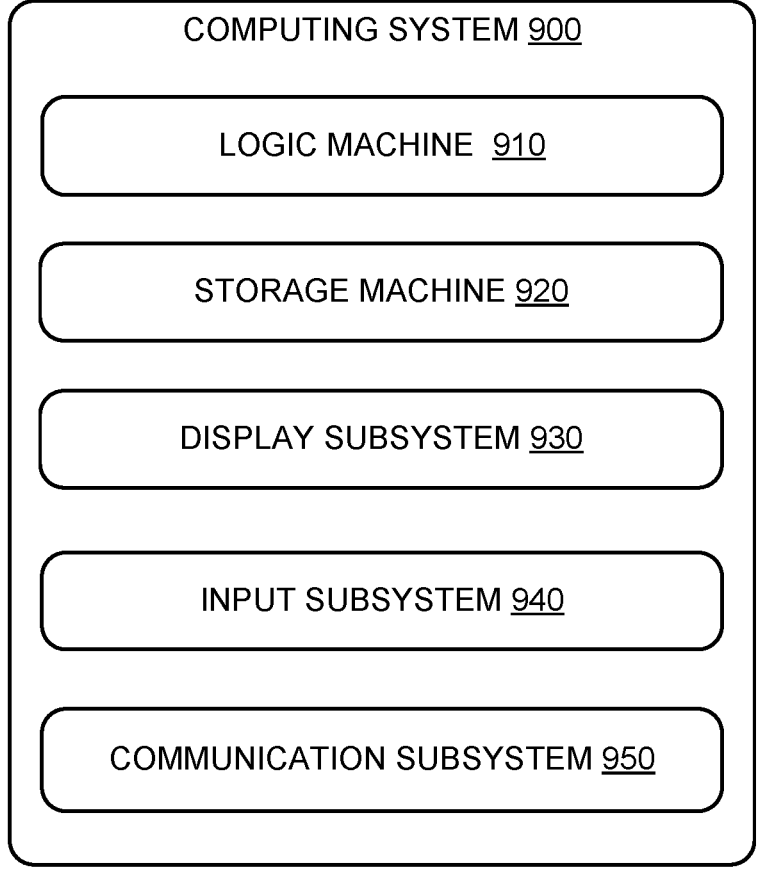
FIG. 9 schematically shows an example computing device.

FIG. 9 schematically shows a non-limiting embodiment of a computing system 900 that can enact one or more of the methods and processes described above. Computing system 900 is shown in simplified form. Computing system 900 may take the form of one or more personal computers, server computers, tablet computers, home-entertainment computers, network computing devices, gaming devices, mobile computing devices, mobile communication devices (e.g., smart phone), and/or other computing devices.

Computing system 900 includes a logic machine 910 and a storage machine 920. Computing system 900 may optionally include a display subsystem 930, input subsystem 940, communication subsystem 950, and/or other components not shown in FIG. 9. HMD devices 115, 200, and 300, and wearable device 400 may be examples of computing system 900. Controllers 230, 301, and 430 may be examples of logic machine 910. Display system 204 may be an example of display subsystem 930. Face tracking systems 240 and 302 may be examples of input subsystem 940.

Logic machine 910 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 920 includes one or more physical devices configured to hold instructions executable by the logic machine to implement the methods and processes described herein. When such methods and processes are implemented, the state of storage machine 920 may be transformed—e.g., to hold different data.

Storage machine 920 may include removable and/or built-in devices. Storage machine 920 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 920 may include volatile, nonvolatile, dynamic, static, read/write, read-only, random-access, sequential-access, location-addressable, file-addressable, and/or content-addressable devices.

It will be appreciated that storage machine 920 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 910 and storage machine 920 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 implemented to perform a particular function. In some cases, a module, program, or engine may be instantiated via logic machine 910 executing instructions held by storage machine 920. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 930 may be used to present a visual representation of data held by storage machine 920. This visual representation may take the form of a graphical user interface (GUI). As the herein described methods and processes change the data held by the storage machine, and thus transform the state of the storage machine, the state of display subsystem 930 may likewise be transformed to visually represent changes in the underlying data. Display subsystem 930 may include one or more display devices utilizing virtually any type of technology. Such display devices may be combined with logic machine 910 and/or storage machine 920 in a shared enclosure, or such display devices may be peripheral display devices.

When included, input subsystem 940 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 950 may be configured to communicatively couple computing system 900 with one or more other computing devices. Communication subsystem 950 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices via a network such as the Internet.

In one example, a wearable device comprises a first electrode positioned on an exterior of the wearable device; a reporting capacitor, wherein the first electrode forms a first side of the reporting capacitor, and wherein a second side of the reporting capacitor is formed by skin of a user when the wearable device is being worn by the user; an oscillator configured to output a signal to drive the first electrode at a first frequency, the oscillator configured such that changes in capacitance at the reporting capacitor adjust the signal output by the oscillator from the first frequency to a second frequency; a frequency-to-voltage converter configured to generate a voltage representation of the second frequency; and a controller configured to determine a change between the first frequency and the second frequency based on the voltage representation, and to indicate an amount of movement of skin of the user relative to the first electrode based on the determined frequency change. The technical effect of implementing a wearable device with such circuitry is a realization of energy savings based at least on a reduced voltage needed to drive the first electrode. In such an example, or any other example, the wearable device additionally or alternatively comprises an envelope detector configured to receive the voltage representation of the second frequency from the frequency-to-voltage converter, and to output amplitude levels of the voltage representation of the second frequency to the controller. In any of the preceding examples, or any other example, the oscillator is additionally or alternatively an active inductor-capacitor oscillator. In any of the preceding examples, or any other example, the active inductor-capacitor oscillator is a Colpitts oscillator. In any of the preceding examples, or any other example, the reporting capacitor is additionally or alternatively comprised in a resistor-capacitor-inductor parallel resonance circuit. In any of the preceding examples, or any other example, the frequency-voltage converter additionally or alternatively comprises at least a differentiator configured to take a time derivative of signals received from the oscillator. In any of the preceding examples, or any other example, the wearable device additionally or alternatively comprises a voltage follower positioned between the oscillator and the differentiator. In any of the preceding examples, or any other example, the wearable device is additionally or alternatively a head-mounted device. In any of the preceding examples, or any other example, the first electrode is additionally or alternatively positioned on a temple of the head-mounted device. In any of the preceding examples, or any other example, a portion of the wearable device that is in contact with the skin of the user is additionally or alternatively coupled to ground when the wearable device is being worn by the user. In another example, a method for a wearable device comprises driving, with an oscillating waveform, a first electrode positioned on an exterior of the wearable device, the first electrode forming a first side of a reporting capacitor, wherein a second side of the reporting capacitor is formed by skin of a user when the wearable device is being worn by the user; monitoring a capacitance at the reporting capacitor based on changes in a frequency of the oscillating waveform; converting the frequency of the oscillating waveform to a voltage representation; and identifying a presence of skin of the user, based on recognizing a threshold change in the voltage representation at an envelope detector. The technical effect of implementing such a method is an improvement in usability, due at least to an increase in battery life and reduced heat generated by a wearable device.

In such an example, or any other example, the method additionally or alternatively comprises, responsive to identifying the presence of skin of the user, identifying movement of the user skin in a Z direction relative to the first electrode based on changes in the voltage representation at the envelope detector. In any of the preceding examples, or any other example, envelope detector is additionally or alternatively configured to receive the time derivative of the oscillating waveform from the differentiator, and to output amplitude levels of the voltage representation to a controller. In any of the preceding examples, or any other example, converting the frequency of the oscillating waveform to a voltage representation additionally or alternatively comprises passing the oscillating waveform through a differentiator configured to take a time derivative of the oscillating waveform. In any of the preceding examples, or any other example, the oscillating waveform is additionally or alternatively passed through a voltage follower prior to passing through a differentiator.

In yet another example, a circuit for determining a frequency of an oscillating waveform using envelope detection comprises an oscillator, configured to output the oscillating waveform with a frequency based at least on a capacitance of a reporting capacitor; a voltage follower, comprising at least a unipolar amplifier, the unipolar amplifier configured to output an oscillating signal based on the frequency of the oscillating waveform; a differentiator, configured to receive the oscillating signal from the voltage follower; take a differential of the oscillating signal to generate a pulsed signal; and output the pulsed signal; and an envelope detector, configured to: receive the pulsed signal from the differentiator; pass the pulsed signal through a diode configured in a forward bias; charge a detection capacitor so that a peak voltage of the pulsed signal is in a steady state with an output voltage; and indicate a frequency of the oscillating signal based at least on the output voltage. The technical effect of implementing such a circuit is a reduction in energy consumption while maintaining detection levels at a usable sensitivity. In such an example, or any other example, the reporting capacitor is additionally or alternatively comprised in a resistor-capacitor-inductor parallel resonance circuit. In any of the preceding examples, or any other example, the oscillator is additionally or alternatively a Colpitts oscillator. In any of the preceding examples, or any other example, the unipolar amplifier is additionally or alternatively an operational amplifier. In any of the preceding examples, or any other example, the circuit is additionally or alternatively fabricated using complementary metal-oxide semiconductor processes.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A wearable device, comprising:
a first electrode positioned on an exterior of the wearable device;
a reporting capacitor, wherein the first electrode forms a first side of the reporting capacitor, and wherein a second side of the reporting capacitor is formed by skin of a user when the wearable device is being worn by the user;
an oscillator configured to output a signal to drive the first electrode at a first frequency, the oscillator configured such that changes in capacitance at the reporting capacitor adjust the signal output by the oscillator from the first frequency to a second frequency;
a frequency-to-voltage converter configured to generate a voltage representation of the second frequency; and
a controller configured to determine a change between the first frequency and the second frequency based on the voltage representation, and to indicate an amount of movement of skin of the user relative to the first electrode based on the determined frequency change.

2. The wearable device of claim 1, further comprising an envelope detector configured to receive the voltage representation of the second frequency from the frequency-to-voltage converter, and to output amplitude levels of the voltage representation of the second frequency to the controller.

3. The wearable device of claim 1, wherein the oscillator is an active inductor-capacitor oscillator.

4. The wearable device of claim 3, wherein the active inductor-capacitor oscillator is a Colpitts oscillator.

5. The wearable device of claim 1, wherein the reporting capacitor is comprised in a resistor-capacitor-inductor parallel resonance circuit.

6. The wearable device of claim 1, wherein the frequency-voltage converter comprises at least a differentiator configured to take a time derivative of signals received from the oscillator.

7. The wearable device of claim 6, further comprising a voltage follower positioned between the oscillator and the differentiator.

8. The wearable device of claim 1, wherein the wearable device is a head-mounted device.

9. The wearable device of claim 8, wherein the first electrode is positioned on a temple of the head-mounted device.

10. The wearable device of claim 1, wherein a portion of the wearable device that is in contact with the skin of the user is coupled to ground when the wearable device is being worn by the user.

11. A method for a wearable device, comprising:
driving, with an oscillating waveform, a first electrode positioned on an exterior of the wearable device, the first electrode forming a first side of a reporting capacitor, wherein a second side of the reporting capacitor is formed by skin of a user when the wearable device is being worn by the user;
monitoring a capacitance at the reporting capacitor based on changes in a frequency of the oscillating waveform;
converting the frequency of the oscillating waveform to a voltage representation; and
identifying a presence of skin of the user, based on recognizing a threshold change in the voltage representation at an envelope detector.

12. The method of claim 11, further comprising:
responsive to identifying the presence of skin of the user, identifying movement of the user skin in a Z direction relative to the first electrode based on changes in the voltage representation at the envelope detector.

13. The method of claim 11, wherein the envelope detector is configured to receive a time derivative of the oscillating waveform from a differentiator, and to output amplitude levels of the voltage representation to a controller.

14. The method of claim 13, wherein the oscillating waveform is passed through a voltage follower prior to passing through the differentiator.

15. The method of claim 11, wherein converting the frequency of the oscillating waveform to the voltage representation comprises passing the oscillating waveform through a differentiator configured to take a time derivative of the oscillating waveform.

16. A circuit for determining a frequency of an oscillating waveform using envelope detection, comprising:

an oscillator, configured to output the oscillating wave-
form with a frequency based at least on a capacitance
of a reporting capacitor;

a voltage follower, comprising at least a unipolar ampli-
fier, the unipolar amplifier configured to output an
oscillating signal based on the frequency of the oscil-
lating waveform;

a differentiator, configured to:

receive the oscillating signal from the voltage follower;

take a differential of the oscillating signal to generate a pulsed signal; and output the pulsed signal; and an envelope detector, configured to:

receive the pulsed signal from the differentiator;

pass the pulsed signal through a diode configured in a forward bias;

charge a detection capacitor so that a peak voltage of
the pulsed signal is in a steady state with an output
voltage; and indicate a frequency of the oscillating signal based at least on the output voltage.

17. The circuit of claim 16, wherein the reporting capaci-
tor is comprised in a resistor-capacitor-inductor parallel
resonance circuit.

18. The circuit of claim 16, wherein the oscillator is a Colpitts oscillator.

19. The circuit of claim 16, wherein the unipolar amplifier
is an operational amplifier.

20. The circuit of claim 16, wherein the circuit is fabri-
cated using complementary metal-oxide semiconductor processes.

\* \* \* \* \*